Patented Mar. 12, 1946

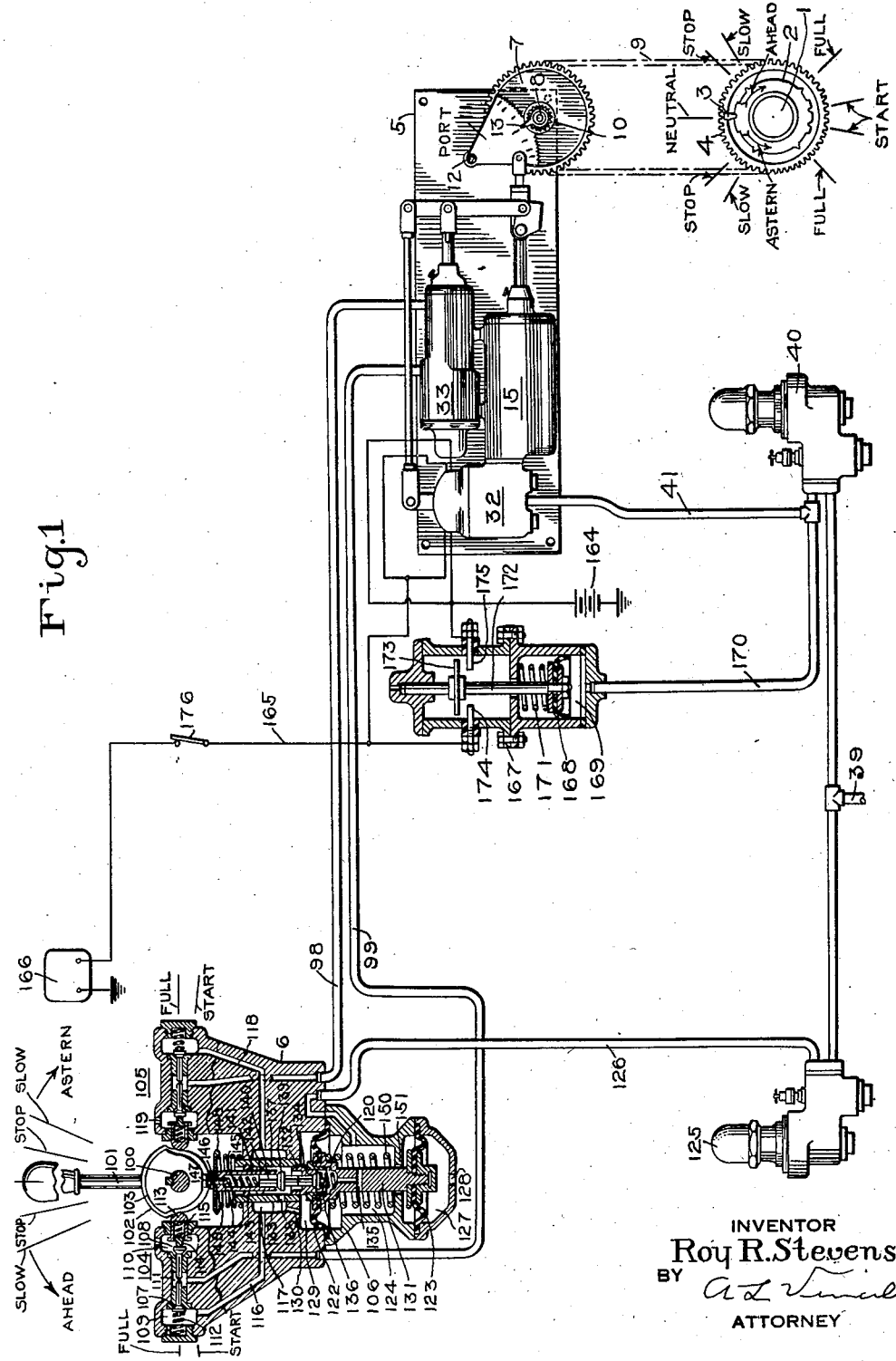

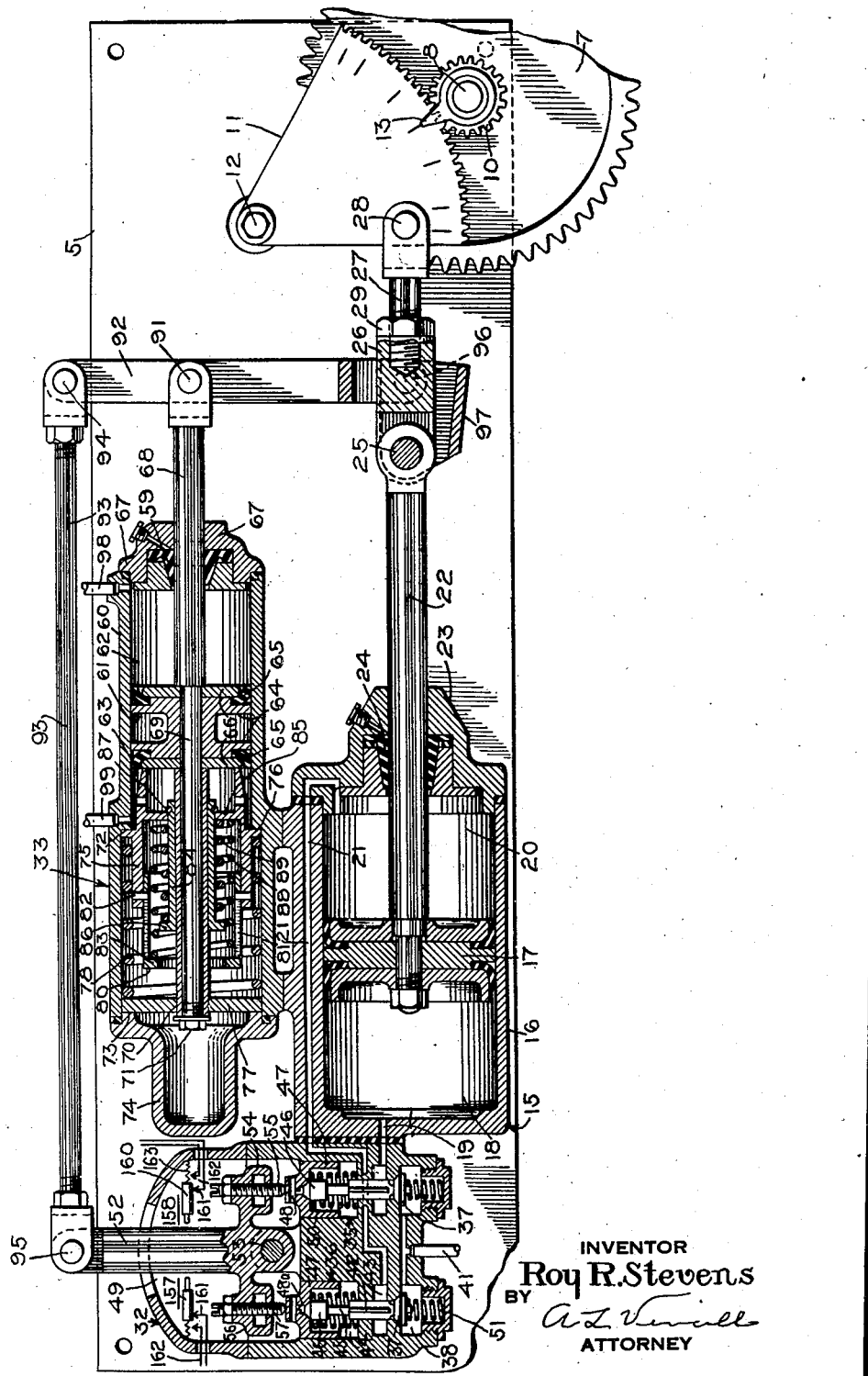

2,396,448

UNITED STATES PATENT OFFICE 2,396,448

FLUID PRESSURE CONTROL MECHANISM

Roy R. Stevens, Forest Hills, Pa., assignor to The Westinghouse Air Brake Company, Wilmerding, Pa., a corporation of Pennsylvania Original application October 29, 1942, Serial No. 463,792, now Patent No. 2,383,278, dated August 21, 1945. Divided and this application October 2, 1943, Serial No. 504,701

1 Claim. (Cl. 121—41)

This invention relates to fluid pressure control mechanism and more particularly to means for remotely controlling the selective positioning of a multi-position device; the present application being a division of my copending application, Serial No. 463,792, filed October 29, 1942, and issued as Patent No. 2,383,278 on August 21, 1945.

In marine craft, such as powered by Diesel engines, a maneuvering gear is usually provided on the engine for controlling same. One type of gear embodies a multi-position element such as a wheel which is rotatable to different engine controlling positions, including a neutral position in which the engine is stopped. At one side of neutral position is a forward starting position for putting the engine in motion in a direction to cause movement of the craft forwardly, a control zone for varying the amount of fuel supplied to the engine to govern the speed or power output of the engine, and a stop position for cutting off the supply of fuel to the engine for causing same to stop. At the opposite side of neutral position there is another starting position for putting the engine in motion in the reverse direction to cause astern movement of the craft, a control zone for varying the power output or speed of the engine operating in this reverse direction, and an engine stopping position.

One object of the invention is the provision of a fluid pressure power system for selectively controlling the position of a multi-position device, such as the maneuvering gear just described.

Another object of the invention is the provision of a fluid pressure system providing for selective positioning of a maneuvering gear or the like from a remote control station such as the deck or pilot house of a marine craft.

Another object of the invention is the provision of a remote control pneumatic power positioning system for a maneuvering gear or the like so constructed as to provide prompt and accurate positioning of the gear in response to different selected operations of an operator.

According to the above objects I provide a pneumatic remote control system for selectively causing prompt and accurate movement of a device to be controlled to any selected one of a plurality of positions. This system is associated, for illustrative purposes only, with a maneuvering gear such as above described and embodies a manually operable selector device arranged to be located in the pilot house of a marine craft and connected for remotely controlling a prime mover located at the engine in the craft for controlling the maneuvering gear associated with said engine, said prime mover being operative in response to manual positioning of said selector device to correspondingly position said maneuvering gear.

Different maneuvering gears or other similar devices may have positions which differ in number, function, and disposition from the positions of the specific maneuvering gear above described, but the invention with suitable modification within its scope is equally applicable to the control of such gears or devices as to the structure used for illustration, as will be readily apparent to those skilled in the art from the description to follow.

Other objects and advantages will be apparent from the following more detailed description of the invention.

In the accompanying drawings, Fig. 1 is a diagrammatic view, partly in section and partly in outline, of the improved remote control system arranged for controlling the maneuvering gear of a marine craft; and Fig. 2 is cross-sectional view of the power means shown in Fig. 1 employed for actuating the maneuvering gear to its different controlling positions.

Description

In the drawings the reference numeral 1 indicates a rockable control shaft of a maneuvering gear, such as used on marine craft, and the numeral 4 indicates a wheel for turning said shaft to different positions to control the starting of an internal combustion engine in either one direction or in the reverse direction, dependent upon the desired direction of movement of the craft, and to then control or vary the power output or speed of the engine, and to stop the engine when desired. These different positions may be identicated by a pointer 3 associated with wheel 4 and suitable legends applied to a stationary index head 2, as shown in the drawings, it being noted that rotation of the wheel in a clockwise direction from "Neutral" position is arranged to provide for movement of the craft in an "Ahead" direction, while rotation in the opposite direction is arranged to provide for "Astern" movement of the craft. At both of the opposite sides of "Neutral" position there is a "Start" position for putting the engine in motion in either one direction or the reverse direction, a "Full" position to obtain maximum engine output, a "Slow" position to provide for operation of the engine at a chosen reduced output or at an idling speed, and a "Stop" position for stopping the engine. The space between the legends "Full" and "Slow" at each side of "Neutral" position constitutes a zone for obtaining different degrees of engine output or speed between the maximum, and minimum or idling.

The invention comprises remote controlled power means for moving any member such as the wheel 4 and shaft 1 promptly and with accuracy to any selected one of a plurality of positions such as the positions just described for shaft 1 and wheel 4. The means controlled by shaft 1 for controlling the engine are therefore not essential to a clear understanding of the invention, and will not be further discussed.

In practice the wheel 4 and shaft 1 are mounted directly on the engine to be controlled. According to the invention I provide the wheel 4 with sprocket teeth and secure directly to the engine and preferably over the wheel 4 a plate or panel 5 for carrying a power means to actuate the sprocket wheel 4 to turn the shaft 1 to its different positions. A manual selector device 6 is provided for controlling the operation of this power means. The selector device 6 may be located at any suitable station as in the pilot house of the craft and thus remote from the power means and engine to be controlled.

The power means carried by the panel 5 comprises a sprocket wheel 7 which is journaled on a shaft 8 secured to said panel. This sprocket wheel is preferably identical with the sprocket wheel 4 and is aligned therewith, and the two wheels are connected together by a chain 9 for rotation in unison. A pinion gear 10 secured to sprocket wheel 7 has driven engagement with a gear sector 11 which is journaled on a pin 12 secured to the panel 5. Rotation of the sector 11 in either one direction or in the opposite from a neutral position shown will therefore operate the sprocket wheels 7 and 4 to turn the maneuvering gear shaft 1 to the different positions above described, as will be apparent. A pointer 13 fixed against turning to the end of shaft 8 overlies the adjacent portion of gear sector 11 for registering with lines or legends which may be located on said sector, as shown in Fig. 2, to correspond with the different positions of the maneuvering gear shaft 1. The main purpose of pointer 13 is to insure that the gear sector 11 will be in its neutral position shown at the time the chain 9 is applied to the sprocket wheels 4 and 7 with the wheel 4 in its neutral position shown, so as to insure exact positioning of the maneuvering gear shaft 1 for different positions of the gear sector 11.

For operating the gear sector 11, I mount on the panel 5 a pneumatic control motor 15 which comprises a power cylinder 16 containing a double acting piston 17 having at one side a pressure chamber 18 connected to a passage 19 and having at the opposite side a pressure chamber 20 connected to a passage 21. The piston 17 has a rod 22 extending centrally from one face through the pressure chamber 20 and through a pressure head 23 closing the outer end of said chamber. A suitable packing 24 is mounted in the head 23 around the rod 22 to prevent leakage of fluid under pressure from the pressure chamber 20 to the atmosphere along said rod. The outer end of the rod 22 is pivotally connected by a pin 25 to one end of a link 26 the opposite end of which is adjustably connected by screw threads to one end of a link 27. The opposite end of link 27 is pivotally connected by a pin 28 to the gear sector 11. A lock nut 29 screw-threaded on the link 27 is arranged for engagement with the end of link 26 for rigidly securing the two links in an adjusted condition.

The piston 17 is shown in Fig. 2 in a neutral position for correspondingly positioning the gear sector 11, sprocket gears 7 and 4 and thereby the maneuvering gear shaft 1. Movement of the piston 17 in cylinder 16 in the direction of the right hand will operate to turn the gear sector 11 in a counterclockwise direction, which in turn will rotate the sprocket wheels 7 and 4 and thus the maneuvering gear shaft 1 in a clockwise direction to provide for forward movement of the craft, while movement of piston 17 from its neutral position in the opposite direction or toward the left hand will cause movement of the maneuvering gear shaft 1 in the reverse direction to provide for astern movement of the craft.

The operation of piston 17 to move the maneuvering gear shaft 1 to its different positions is arranged to be effected by a differential in fluid pressures provided in chambers 18 and 20 by a control valve device 32 mounted on one end of the power cylinder 16, said control device being in turn controlled by the cooperative action of the power piston 17 and of a pilot device 33 mounted on top of the power cylinder 16, as will be later described.

The control valve device 32 comprises a casing containing fluid pressure supply and release valve mechanisms 35 and 36, respectively, arranged to control, through passages 19 and 21, the supply of fluid under pressure to and its release from chambers 18 and 20, respectively, at opposite sides of the power piston 17.

Both of the valve mechanisms 35 and 36 may be of identical structure, each comprising a supply valve 37 contained in a chamber 38 which is constantly supplied with fluid at a desired reduced pressure, such as 65 pounds, from any suitable source by way of a pipe 39, a reducing valve device 40 and a pipe 41. Each supply valve 37 has a fluted stem 42 extending through two suitably aligned bores provided in the casing at opposite sides of a chamber 43, and into a chamber 44 where said stem is connected by a reduced portion 45 to an axially arranged release valve 46. A plunger 47 is slidably mounted in a bore in the casing, the chamber 44 at one side of the plunger constituting one end portion of this bore. Any suitable packing means (not shown) may be provided between plunger 47 and the wall of the bore to minimize leakage of fluid under pressure from chamber 44 past said plunger. The plunger 47 has a valve seat provided for engagement by the release valve 46 to close communication between chamber 44 and a passage 48 extending through the plunger and opening to a chamber 49 at the opposite side of the plunger. The chamber 49 is in constant communication with the atmosphere. A spring 50 in chamber 44 acts on the plunger 47 to unseat same from the exhaust valve 46, while a spring 51 in chamber 38 acts on the supply valve 37 for seating same.

The valve 37 is arranged to control flow of fluid under pressure from chamber 38 to chamber 43, while valve 46 is arranged to release fluid under pressure from chamber 43 by way of the fluted stem 42 of valve 37 and thence through chamber 44 and past the valve 46 to exhaust passage 48. Chamber 43 in valve device 35 is connected to passage 19 leading to chamber 18 at one side of the power piston 17, while chamber 43 in valve device 36 is connected to passage 21 leading to chamber 20 at the opposite side of power piston 17.

For controlling operation of the two valve devices 35 and 36 a lever 52 pivoted on a pin 53 in the casing is movable in a direction parallel to the length of the power cylinder 16, and it will be noted that said valve devices are located at the opposite sides of said pin in the direction of the rocking of said lever. Adjacent pivot pin 53 the lever 52 has an outstanding arm 54 which includes an adjustable pin 55 engaging plunger 47 of the valve device 35. An oppositely extending arm 56 includes an adjustable operating pin 57 which engages plunger 47 of the valve device 36.

With the lever 52 in its neutral position shown, both screws 55 and 57 are adjusted to move the plungers 47 in the respective valve devices 35 and 36 downwardly into seating engagement with the release valves 46 and then a slight further adjustment of both of said screws is effected to open the supply valves 37 to a small degree. Fluid under pressure from the supply pipe 41 will then flow past the valves 37 to passages 19 and 21 and thence into chambers 18 and 20, respectively, at opposite sides of the power piston.

The pressure of fluid thus obtained in chamber 18 is effective past the fluted stem 42 of valve 37 in chamber 44 of the valve device 35 wherein it acts on the respective plunger 47 to urge same in a direction to permit seating of the supply valve 37. Likewise, the pressure of fluid in chamber 20 is effective in chamber 44 of the valve device 36 wherein it acts on the respective plunger 47 to urge same in the same direction, it being noted that the fluid pressure acting on one plunger 47 opposes that on the other. When the pressure of fluid thus obtained past the supply valves 37 in chambers 18 and 20 and acting on plungers 47 is increased to a certain degree, a sufficient movement of both of said plungers will occur to permit seating of the supply valves 37 and thus prevent further flow of fluid under pressure to chambers 18 and 20.

In actual practice it has been found that a fluid pressure such as fifty pounds in chambers 44 acting on the plungers 47 will create such movement or deformation of said plungers or other parts of the device as to provide for seating of the supply valves 37 if said valves are initially unseated for instance around one thousandth of an inch by adjustment of the screws 55 and 57.

It will be noted that the two plungers 47 are oppositely connected through the adjusting screws 55 and 57 and the two arms 54 and 56, respectively, of the operating lever 52 and that such connections constitute what would commonly be considered rigid connections. The seating of the valves 37 when the plungers 47 are subjected to a certain pressure of fluid in chambers 44 is therefore considered or believed due to the elasticity of the materials in the connections between said plungers and the lever 52, but the elastic limit of said materials is not exceeded so that permanent deformation of any part of the connections does not occur.

From the above description it will be noted that both of the valve devices 35 and 36 operate with lever 52 in its neutral position on what is commonly known as the self-lapping principle but such operation is not dependent upon control springs which have heretofore been considered necessary, as illustrated by way of example in a similar pneumatic control motor disclosed in my copending application No. 432,776, filed February 28, 1942.

With the lever 52 in its neutral position shown and chambers 18 and 20 at opposite sides of the power piston 17 both charged with fluid at the same degree of pressure, said piston will be in a static condition and for instance in neutral position as shown in Fig. 2. These same pressures acting on the two plungers 47 also oppose and balance each other and will not therefore oppose initial movement of the lever 52 out of the neutral position shown.

Now let it be assumed that the lever 52 is rocked in a clockwise direction from neutral position. The operating pins 55 and 57 will move with said lever and allow the pressure of fluid in chamber 44 of the valve device 36 to move the plunger 47 thereof with the pin 57 and thus out of engagement with the respective exhaust valve 46, while in the valve device 35 the operating pin 55 will shift the plunger 47 downwardly to unseat the supply valve 37. As a result of this operation fluid under pressure will be released from chamber 20 to reduce the pressure on one side of the power piston 17 and at the same time fluid under pressure will be supplied from the supply pipe 41 to chamber 18 for increasing the pressure of fluid on the opposite side of the power piston. A differential between the fluid pressures at opposite sides of the power piston 17 will be thus created acting in the direction of the right hand which will move said piston in said direction to thereby actuate the gear sector 11 and sprocket wheels 7 and 4 to turn the maneuvering gear shaft 1 in a clockwise direction.

In the operation just described it will be noted that a minimum of effort is required to initiate movement of the lever 52 from its neutral position due to the initial balance of fluid forces on the two plungers 47 as above mentioned, and this provides for quick response of the power piston 17 to operation of the pilot device 33 which will be later described. However after the release valve 46 in the valve device 36 is opened to reduce the pressure of fluid in the power piston chamber 20 and the supply valve 37 in the valve device 35 is opened to increase the pressure in the power piston chamber 18, the corresponding reduction in pressure on plunger 47 in the valve device 36 and increase in pressure on plunger 47 in the valve device 35 creates a force which opposes movement of the lever 52 and tends to return same to its neutral position. This is not material however since the actuating force applied to the lever by the pilot device 33, as will be later described, prevents such undesired reverse movement of the lever.

When the maneuvering gear shaft 1 obtains a desired position under the action of the power piston 17 it is necessary to stop movement of this piston and this is obtained, as will be later described, by the cooperative action of said piston and the pilot device 33 to return the lever 52 to its neutral position for again balancing the fluid pressures on opposite sides of said piston. As the lever 52 is thus returned to neutral position, the upward movement of the adjusting pin 55 will permit seating of the supply valve 37 of the valve device 35 following which the plunger 47 of said device will be moved out of contact with the respective release valve 46 by the pressure of fluid in the chamber 44 which pressure will at this instant be in excess of the normal degree of for instance fifty pounds. The pressure in the power piston chamber 18 and below the plunger 47 in the valve device 35 will then reduce past the respective release valve 46 until when the normal degree of fifty pounds is obtained the resiliency of the connection between the lever and said plunger will urge said plunger into seating engagement with said release valve and thus bottle the remaining fluid in said chamber. At the same time that this occurs the pin 57 will actuate the valve device 36 to increase the pressure in the power piston chamber 20 to the normal degree of for instance fifty pounds as before described, whereupon the piston 17 will be stopped, subject on opposite sides to fluid pressures of the same degree but less than the pressure of the supply fluid in pipe 41.

If the lever 52 is again rocked out of neutral position in the direction of the right hand, a differential of pressures will be again created on the power piston to move same further toward the right-hand and such movement will cease in a position determined by when the lever 52 is returned to neutral position, as will be clear from the above description. It will thus be seen that the piston 17 can be caused to turn the maneuvering gear shaft 1 in a clockwise direction and to stop said shaft in any position dependent upon the return of lever 52 to its neutral position.

Only a certain differential of fluid pressures is required on the power piston 17 to ensure operation thereof to turn the maneuvering gear shaft 1, and any greater differential would result not only in waste of fluid under pressure but in an increased degree of time for balancing the opposing fluid pressures on said piston in order to stop movement thereof in a selected position, or in other words, to prevent travel of the piston and thereby of the maneuvering gear shaft past or beyond the selected position.

This limiting of the differential of fluid pressures on the power piston is preferably obtained by restricting the release of fluid under pressure from the one side of the power piston through the release passage 48 with respect to the rate of supply of fluid under pressure to the opposite side. To accomplish this the release passage 48 may be provided with a suitable choke or restriction 48a to provide the desired reduced venting capacity and in the operation above described it will be seen that this restricted release of fluid under pressure from chamber 20 at one side of the power piston acting in conjunction with the displacement of said piston will prevent the pressure in chamber 20 becoming reduced excessively with respect to increasing pressure in chamber 18 during movement of said piston by fluid pressure in chamber 18. The differential of pressures on the piston will be thus limited so that when the lever 52 is returned to neutral position, a shorter period of time, than otherwise would be necessary, will be required to increase the pressure in chamber 20 back to the normal degree for stopping the piston with accuracy in the desired position.

In addition to the above, the limiting of the reduction in pressure in chamber 20 also results in a corresponding limit in the reduction in pressure on plunger 47 of the valve device 36 and hence a like limiting of the differential of forces applied to the lever 52 by the two plungers 47, and this is desirable in that after the lever is out of neutral position it minimizes the degree of force which opposes movement of said lever by the pilot device 33 which will be later described.

It will now be seen that clockwise movement of lever 52 from neutral position will cause prompt movement of the power piston toward the right hand and that this movement of said piston will cease in a position determined by the return of lever 52 to neutral position.

If the lever 52 is moved from neutral position in a counterclockwise direction the valve device 36 will be operated to effect an increase in fluid pressure in chamber 20 and the valve device 35 will at the same time be operated to reduce the pressure in chamber 18 to thereby provide a differential of fluid pressures on the power piston 17 for moving same in the direction of the left hand to turn the maneuvering gear shaft 1 in a counterclockwise direction. Return of the lever 52 to neutral position will effect equalization of the pressures on the power piston to stop same. This operation is identical in all respects to that resulting from clockwise movement of the lever 52 from neutral position and subsequent return to neutral position and a further description thereof is therefore not considered necessary.

The pilot device 33 comprises a cylinder 60 containing a double acting piston 61 having at one side a pressure chamber 62 and at the opposite side a pressure chamber 63. The piston 61 comprises a pressure head 64, two oppositely disposed packing cups 65 mounted against opposite faces of said head and clamped thereto by two oppositely arranged pressure plates 66. The pressure chamber 62 is closed by a pressure head 67 through which extends a piston rod 68. A suitable packing 59 is provided in the head 67 for contact with rod 68 to prevent leakage of fluid under pressure from chamber 62 along said rod to the atmosphere. The end of rod 68 in chamber 62 engages one of the pressure plates 66 and said rod is provided with a portion 69 of reduced section which extends through both of the plates 66 and the piston head 61 into pressure chamber 63. A sleeve 70 in chamber 63 is mounted on the reduced portion 69 of the piston rod and urged against the adjacent pressure plate 66 by a nut 71 provided on the end of said reduced portion for securely clamping the two packing cups 65 to the pressure head 61.

The portion of chamber 63 adjacent the piston 61 is of the same diameter as chamber 62 for cooperation with said piston, but beyond this portion the chamber 63 is of greater diameter in order to provide two spaced annular shoulders 72 and 73, the shoulder 73 being provided on the end of a cover 74 which closes the left hand end of chamber 63. A sleeve 75 slidably mounted in the enlarged portion of chamber 63 has substantially midway between its ends an annular outstanding collar 76 arranged to engage shoulder 72 for limiting movement of said sleeve in the direction of the right hand to the position shown. A washer 77 slidably mounted on sleeve 70 ahead of nut 71 is also arranged to slide in the enlarged portion of chamber 63 and to engage shoulder 73 provided on the end of cover 74 for limiting movement of the washer toward the left hand. Interposed between and bearing against the adjacent faces of washer 77 and collar 76 outside of the sleeve 75 is a coil spring 78 arranged to oppose movement of the washer 77 in the direction of collar 76 and to also oppose movement of said collar and the sleeve 75 in the direction of said washer. Normally, that is, when both chambers 62 and 63 are at atmospheric pressure, the spring 78 is arranged to hold the washer 77 in contact with shoulder 73 and the annular collar 76 in contact with shoulder 72. Under this condition, one end of sleeve 75 is arranged to engage the adjacent face of the pilot piston 61 for thereby defining and holding the pilot piston 61 in its neutral position shown in Fig. 2.

A caging element 80 is slidably mounted in the end of sleeve 75 opposite that engaging piston 61. This element has one or more slots 81 extending lengthwise thereof and the sleeve 75 is provided with a pin 82 which extends into each slot 81 for limiting movement of the element 80 outwardly of the sleeve 75. The outer end of the caging element 80 has an inturned spring seat 83.

A second caging element 84 is slidably mounted on sleeve 70 and freely extends through a suitable opening provided through an annular rib 85 extending inwardly from the sleeve 75. At the end of the caging element 84 adjacent spring seat 83 on the element 80 is an annular outwardly extending spring seat 86. A snap ring 87 is secured in an annular groove adjacent the opposite end of sleeve 84 and at the opposite side of rib 85 for contact with said rib.

Two coil springs 88 and 89 under a chosen degree of pressure and encircling the caging element 84 within the sleeve 75 bear at one end against the rib 85 on said sleeve. The opposite end of the outer spring 88 bears against the spring seat 83 provided on the caging element 80, while the opposite end of the inner spring 89 bears against spring seat 86 provided on the caging element 84. With the piston 61 in the neutral position shown the outer spring 88 is therefore confined under pressure between the spring seat 83 on the caging element 80 and the rib 85 on the sleeve 75 due to the interengagement of pins 82 with the caging element 80 within the slots 81. Likewise, under the same condition the inner spring 89 is confined under pressure between the spring seat 86 on the caging element 84 and rib 85 on sleeve 75 due to engagement between the snap ring 87 and said rib.

The end of the piston rod 68 extending beyond the pressure head 67 is pivotally connected by a pin 91 to a lever 92 intermediate its ends. A rod 93 is pivotally connected at one end by a pin 94 to one end of the lever 92 while the opposite end of said rod is pivotally connected by a pin 95 to the end of lever 52 outside of the control valve device 32. The opposite end of lever 92 is pivotally connected by a pin 96 to one end of a link 97 the opposite end of which is pivotally connected by pin 25 to the end of the power piston rod 22. The link 97 provides for rocking of the lever 92 with respect to the pilot piston rod 68 and power piston rod 22, it being seen that both of said rods are rigidly held in parallel relation by pressure heads 67 and 23, respectively.

The pressure chamber 62 at one side of the pilot piston 61 is connected by a pipe 98 to the manually operative selector valve device 6, while chamber 63 at the opposite side of said piston is connected by a pipe 99 to said device.

The selector device 6 located at the operator's control station, as in the pilot house of the ship and therefore remote from the pneumatic control motor 15, is provided for varying the pressure of fluid in either of the control pipes 98 or 99 while retaining the other of said pipes open to atmosphere, for controlling operation of motor 15 to move the maneuvering gear shaft 1 to its different positions.

The selector valve device 6 comprises a casing in which a rockable shaft 100 is journaled. A lever 101 is secured to shaft 100 to turn same and is movable to different positions indicated by legends in Fig. 1, which positions it will be noted correspond in name to the positions of the maneuvering gear shaft 1. Two cams 102 and 103 are secured to turn with the shaft 100, the cam 102 being provided to control the operation of two directional control or selector valve devices 104 and 105 which are operative in accordance with the direction of movement of lever 101 from its neutral position shown to selectively connect either pipe 98 or pipe 99 to a self-lapping valve device 106 and to open the other of said pipes to atmosphere, the self-lapping valve device 106 being controlled by the cam 103.

The directional control valve devices 104 and 105 are located in the casing opposite each other and at opposite sides of the cam 102. Both of these devices may be of identical construction each comprising two oppositely seating poppet valve 107 and 108 contained in chambers 109 and 110, respectively, and having axially aligned fluted stems engaging each other in a chamber 111. A spring 112 in chamber 109 acts on the valve 107 for seating same and for at the same time unseating the valve 108. A plunger 113 is slidably mounted in the casing and has one end engaging cam 102 while the opposite end is disposed in chamber 110. This plunger carries a pressure member 114 which engages the valve 108 and a spring 115 acting on the pressure member for operating same to seat said valve and unseat the valve 107 upon movement of plunger 113 in the direction of said valves. With the lever 101 and cam 102 in their neutral positions shown in Fig. 1, the plunger 113 is permitted to move away from the valve 108 to provide for seating of valve 107 and unseating of valve 108 by spring 112.

Initial movement of lever 101 in the direction of the left hand from a neutral position in which it is shown will actuate cam 102 and thereby the plunger 113 of the valve device 104 in the direction of valve 108 for seating said valve and unseating the valve 107, this change in condition of the respective valves being obtained by the time the lever 101 obtains the position indicated by the legend "Stop" and being then maintained in all positions of said lever beyond the "Stop" position. Movement of lever 101 in the direction of the right hand is adapted to seat valve 108 and unseat valve 107 in the valve device 105 by the time the lever 101 obtains the "Stop" position at the right hand side of its neutral position and this condition of these valves is then adapted to be maintained in all positions of said lever beyond the "Stop" position. When the lever 101 is rocked toward the left hand for seating the valve 108 and unseating the valve 107 of the valve device 104, the cam 102 provides for the valve 108 in the valve device 105 remaining open and the valve 107 remaining closed. When the lever 101 is moved toward the right hand to actuate the valve device 105 the valve 108 in the valve device 104 is adapted to remain open while the valve 107 is adapted to remain closed.

Chamber 109 in the valve device 104 is connected by a passage 116 to a chamber 117 and the corresponding chamber 109 in the valve device 105 is also connected to chamber 117 by a passage 118. Chamber 111 in the valve device 104 is connected to the control pipe 99 leading to the pilot device 33 while the corresponding chamber in valve device 105 is connected to the control pipe 98 also leading to said pilot device. Chamber 110 in each of the valve devices 104 and 105 is open to the atmosphere through a passage 119.

From the above description it will be seen that upon movement of lever 101 from its neutral position shown in the direction of the left hand the valve device 104 will connect control pipe 99 to chamber 117 while the valve device 105 will open the control pipe 98 to the atmosphere. On the other hand if lever 101 is rocked in the direction of the right hand from neutral position the valve device 105 will connect the control pipe 98 to chamber 117 while the valve device 104 will connect the control pipe 99 to the atmosphere.

The self-lapping valve device 106 is provided for supplying fluid under pressure to chamber 117 and thereby to either pipe 98 or 99 as determined by the direction of movement of the control lever 101 and the consequent operation of the directional control valve devices 104 and 105.

The self-lapping valve device 106 comprises two spaced and axially aligned flexible diaphragms 122 and 123 which are rigidly clamped around their peripheries in the casing. Between these diaphragms is a chamber 124 which is constantly supplied with fluid under pressure from the supply pipe 39 through a suitable reducing valve device 125 and a pipe 126 leading to said chamber, said reducing valve device being operative to maintain the fluid at any desired pressure such as 100 pounds per square inch in the chamber 124. At the opposite side of the diaphragm 123 is a chamber 127 which is constantly open to the atmosphere through a passage 128 while at the opposite side of diaphragm 122 is a chamber 129 in constant communication through a port 130 with chamber 117.

A stem 131 in chamber 124 has one end clamped to the diaphragm 123 while the opposite end is clamped to the diaphragm 122, the means clamping said stem to diaphragm 122 embodying a guide element 132 projecting through chamber 129 and slidably mounted in a bore in the lower end of a sleeve 133 which is secured in the casing in axial alignment with the two diaphragms 122 and 123 and directly below the operating shaft 100 and cam 103.

A poppet valve 134 is contained in a chamber 120 in the upper end of stem 131, which chamber is constantly supplied with fluid under pressure from chamber 124 by way of passages 135 in the stem 131. Chamber 120 also contains a spring 136 acting on the valve 134 for urging same upwardly toward a seat provided on the adjacent end of the guide element 132.

The valve 134 has a fluted stem extending through a suitable bore in the guide element 132 into a chamber 137 provided in sleeve 133. The chamber 137 is constantly open through one or more ports 138 in sleeve 133, to the chamber 117 which encircles said sleeve. A release valve 139 in chamber 137 engages the end of the fluted stem of valve 134 and in turn has a fluted stem 140 mounted to slide in a bore in a plunger 141. The plunger 141 is mounted to slide in sleeve 133 and has suitable guide portions 142 slidably engaging the inner wall of sleeve 133. A ring shaped packing 143 disposed above the guide portions 142 is expanded into an annular groove provided in the inner wall of sleeve 133 and has sliding contact with the outer surface of plunger 141 for preventing leakage of fluid under pressure from chamber 137 along said plunger and out of the upper open end of sleeve 133. The bore in plunger 141 is open above the packing 143 to the atmosphere through one or more ports 144 and said bore contains a spring 145 acting on stem 140 of the release valve 139 urging said valve in a direction out of said bore and thus away from its seated or closed position against the end of said plunger.

An adjusting screw 146 is screw-threaded into the upper end of plunger 141 and has a head 147 which engages the cam 103. A spring seat 148 is secured to the plunger 141 above the end of sleeve 145 and interposed between this seat and the casing is a bias spring 149 which is operative against the spring seat 148 with a force just sufficient to urge the plunger 141 out of seating engagement with the release valve 139, as shown in the drawings.

In chamber 124 between the two flexible diaphragms 122 and 123 is a coil control spring 150 encircling the stem 131 and having one end supported on an annular ledge 151 in the casing while the opposite end acts against the diaphragm 122 for urging same in the direction of sleeve 133. This spring is adapted to be fully expanded with the parts in the position shown in Fig. 1, assumed when the lever 101 is in its neutral position shown, and to oppose all movement of the diaphragms in a downwardly direction from this position. The two diaphragms 122 and 123 are of equal areas so that the pressure of fluid in chamber 124 acting on the diaphragm 122 is opposed and balanced by said fluid pressure acting on the diaphragm 123. Thus spring 150 provides the only force for opposing movement of the diaphragms in a downwardly direction.

*Operation*

With the lever 101 of the selector valve device in its neutral position shown, the spring 149 acting on seat 148 will urge plunger 141 to the position shown in which said plunger is pulled away from the release valve 139 due to the action of spring 145 on said valve and also to the fact that the control spring 150 is expanded to its free height thus removing the force on said valve tending to urge same in an upwardly direction. Under this condition the spring 136 will hold the supply valve 134 in contact with its seat and chambers 117 and 129 will both be open to the atmosphere through ports 138, past the release valve 139 and thence through the bore in plunger 141 and ports 144.

With the selector lever 101 in its neutral position the directional control valve devices 104 and 105 will both occupy the positions shown in which the valves 108 are unseated so that both control pipes 98 and 99 and thereby chambers 62 and 63 at opposite sides of piston 61 in the pilot device 33 will be open to the atmosphere.

With the opposite sides of the pilot piston 61 thus subject to atmospheric pressure said piston will be held in its neutral position shown by sleeve 75 engaging one side of the piston and the washer 77 engaging nut 71 on the end of the piston rod sleeve 70 under the force of spring 78 holding collar 76 on said sleeve in contact with shoulder 72 in the casing and holding the washer 77 in contact with shoulder 73 on the pressure head 74. With the pilot piston 61 in its neutral position all parts of the pneumatic control motor 15 will occupy the neutral positions shown in Fig. 2 for reasons which will be apparent from the description to follow, and accordingly, the gear sector 11 and sprocket wheels 7 and 4 will occupy their neutral positions shown for correspondingly positioning the maneuvering gear shaft 1.

Let it be assumed, as just mentioned, that the lever 101 is initially in its neutral position shown under which condition the engine on the craft will be stopped, and that it is desired to cause operation of said engine to move the craft forwardly. To accomplish this end the operator moves the lever 101 from its neutral position in a counter-clockwise direction, or in a direction indicated by the arrow bearing the legend "Ahead," to the position indicated by the legend "Start." The initial movement of lever 101 out of neutral position actuates the cam 102 to reverse the valves of the directional control valve device 104 to thereby place the control pipe 99 in communication through passage 116 with chamber 117, while the directional control valve device 105 remains in the condition shown opening the control pipe 98 to the atmosphere.

As the lever 101 is thus moved to "Start" position the cam 103 initially operates through the adjusting screw 146 to move the plunger 141 into contact with the release valve 139 and to then move said valve along with said plunger to unseat the valve 134. The cam 103 is so designed that the supply valve 134 will thus be unseated before the lever 101 obtains the stop position.

With the valve 134 unseated as just described fluid under pressure will flow from chamber 124 between the diaphragms past said valve to chamber 137 within sleeve 133 and then through passages 138 to chamber 117 and from chamber 117 through passage 116 and past valve 107 in the directional control valve device 104 to pipe 99 leading to chamber 63 at one side of the pilot piston in the control motor 15. At the same time as fluid under pressure is thus supplied to chamber 117, it also flows through port 130 to chamber 129 at the top of diaphragm 122 and acts on said diaphragm to deflect same in a downwardly direction against spring 150 thus tending to pull the guide element 132 into seating engagement with the supply valve 134. Such seating of valve 134 may be provided for by the time the pressure of fluid in chamber 129 and thus in the control pipe 99 is built up to a chosen degree such as seventy-five pounds, or if desired, the cam 103 may be so designed as to maintain valve 134 open with the lever 101 in "Start" position so that fluid at the relatively high pressure, of for instance one-hundred pounds, supplied by the reducing valve device 125 may be obtained in the control pipe 99.

Fluid at this high pressure obtained in pipe 99 flows to chamber 63 at the left hand side of the pilot piston 61 and acts thereon to move said piston to an extreme right hand position defined by contact between the washer 77 and the left hand end of sleeve 75. As the piston 61 thus moves it will be seen that the initial portion of its movement is opposed only by the spring 78 following which the washer 77 will engage the adjacent end of caging element 80 and then move same relative to the sleeve 75 so that continued movement of the piston will be opposed by both springs 78 and 89. After a certain degree of this continued movement the washer 78 will engage the end of the caging element 84, so that further movement of the piston to its extreme right hand position will then be opposed by all of the springs 78, 89 and 88.

The power piston 17 has a greater resistance to movement than lever 52 and the valve mechanisms 35 or 36 in the control device 32, as a result of which movement of the pilot piston 61 in the direction of the right hand will rock the lever 92 about its fulcrum connection with the power piston rod 22 to thereby pull the operating rod 93 in the direction of the right hand. This movement of the operating rod 93 in turn rocks the control lever 52 in the control device 32 in a corresponding or clockwise direction to thereby actuate the valve device 35 to supply fluid under pressure to chamber 18 and at the same time to actuate the valve device 36 to release fluid under pressure from chamber 20 for thereby establishing a differential of fluid pressures on the power piston 17 for moving same in the direction of the right hand to operate the gear sector 11 and sprocket wheels 7 and 4 to turn the maneuvering gear shaft 1 in a clockwise direction and thus in the direction of the arrow indicated by the legend "Ahead" which corresponds to the direction of movement of the lever 101.

As the power piston 17 is moved in the direction of the right hand it carries with it the lower end of the equalizing lever 92, and after the pilot piston 61 obtains its extreme right hand position above described, said lever is rocked by the power piston 17 in a counterclockwise direction about its fulcrum connection with the pilot piston rod 68 and thus actuates the rod 93 to turn the lever 52 in a counterclockwise direction back toward its neutral position which will be obtained when the power piston obtains a position in which the maneuvering gear shaft 1 is in "Start" position. When the lever 52 is returned to its neutral position as just mentioned, the valve devices 35 and 36 are conditioned as above described to equalize the fluid pressures on the opposite sides of the power piston 17 due to which movement of said piston will stop in a position determined by the position of the pilot piston and hence in accordance with the selected position of the selector lever 101.

When the pilot piston 61 is moved its full stroke as just described the corresponding movement of the power piston 17 will operate the gear sector 11 and thereby the sprocket wheel 7 and connected sprocket wheel 4 to turn the maneuvering gear shaft 1 to its "Start" position in which the engine will be started or placed in motion in a direction for propelling the craft forwardly.

It will now be seen that movement of the operating lever 101 in the direction indicated by the legend "Ahead" in Fig. 1 and to the position indicated by the legend "Start" at the left hand side of the device will cause movement of the maneuvering control shaft 1 in the direction indicated by the legend "Ahead" and to the position indicated by the legend "Start," the direction of movement of and the position obtained for maneuvering shaft 1 therefore corresponding to the direction of movement and position of the operating lever 101 of the selector device 106.

After the engine has been put in motion for causing forward movement of the craft, the lever 101 will be returned from the "Start" position to the adjacent position indicated by the legend "Full" or to any other desired speed position intermediate said "Full" and the next adjacent position indicated by the legend "Slow." As the lever 101 is thus moved from "Start" position in a clockwise direction, the cam 103 permits spring 149 acting on the plunger 148 to move said plunger upwardly and away from the exhaust valve 139, said valve being held against movement at this time by the pressure of spring 145 and due to the fact that the pressure of fluid in chamber 129 above the diaphragm 122 equals at least the opposing control force of spring 150.

When the valve 139 is thus unseated fluid under pressure will be released from the pilot piston chamber 63 through pipe 99 and the directional control valve device 104 to chamber 117 and thence past the release valve 139 to the atmosphere. As the pressure in the pilot piston chamber 63 is thus reduced a corresponding reduction in pressure occurs in chamber 129 above the diaphragm 122 which permits spring 150 to urge said diaphragm and thereby the release valve 139 in an upwardly direction toward plunger 141 and said valve will become seated against said plunger to limit the reduction in pressure in the pilot piston chamber 63 in a position of said plunger determined by the position of cam 103 and of lever 101. If the lever 101 is merely moved to the "Full" position the exhaust valve 139 will become seated when the pressure acting on the pilot piston 63 and thereby in chamber 129 on diaphragm 122 becomes reduced to a certain pressure, such as for instance fifty-two pounds. If, however, the lever 101 is moved to the "Slow" position the spring 149 acting on the plunger 141 will be permitted to raise said plunger to a position where the pressure acting on the pilot piston 63 and in chamber 129 above the diaphragm 122 will become reduced to a pressure such as seventeen pounds. Intermediate positions of the plunger 141 obtained in different positions of lever 101 between the "Full" and "Slow" positions will provide for seating of the exhaust valve 139 when the pressure in chamber 129 above the diaphragm and thus in chamber 63 at one side of the pilot piston becomes reduced to corresponding intermediate pressures, between the fifty-two and seventeen pounds pressures obtained in the "Full" and "Slow" positions, respectively.

When the pressure of fluid in chamber 63 at the left hand side of the pilot piston 61 is reduced by return of lever 101 from "Start" position to either the "Full" or "Slow" positions or an intermediate position, the combined force of srings 78, 88 and 89 on the washer 77 overbalances the pressure of fluid on the pilot piston 61 and pulls said piston in the direction of the left hand until at the time the pressure of such fluid becomes reduced to the high limit of fifty-two pounds above mentioned, the snap ring 87 on the caging element 84 will have contacted the rib 85 of sleeve 75 and thus removed the force of spring 89 from the washer 77. If the pressure of fluid in chamber 63 at one side of the pilot piston is further reduced said piston will be moved under the action of springs 88 and 78 until at the time such pressure is reduced to the seventeen pounds above mentioned, the pressure of spring 88 will have been removed from washer 77 due to the caging element 80 engaging pins 82 in sleeve 75.

As above mentioned the springs 88 and 89 are assembled in the pilot device under a certain degree of precompression, such as for instance of a degree equivalent to five pounds fluid pressure on the pilot piston 61. The seventeen and fifty-two pounds pressures supplied by the selector device in the "Slow" and "Full" positions is approximately two and one-half pounds less than required to move the pilot piston 61 against the springs 88 and 89, respectively, and therefore substantially midway between the pressures required to move said piston into contact with the cages 80 and 84 and to then move said cages. A variation from the seventeen and fifty-two pounds, either above or below these values, of for instance two pounds will therefore have no effect upon the exactness of positioning of the pilot piston with the selector in either "Full" or "Slow" position.

From the above description it will now be seen that with the lever 101 in the "Full" speed position at the left hand side of its neutral position the washer 77 will be just in engagement with spring seat 86 on the caging element 84, but the spring 89 acting on said seat will be ineffective on the pilot piston 61, while when the lever 101 is in the "Slow" position the washer 77 will be just in contact with spring seat 83 on the caging element 80 and the spring 88 will be ineffective on said piston. For all intermediate positions of lever 101 the washer 77 will assume a position opposed and determined by both springs 78 and 88, but unopposed by spring 89 acting on the caging element 84.

Let it be assumed that lever 101 has been returned from "Start" position to "Full" position as a result of which the pilot piston 61 will be moved by springs 78 and 88 to a position in which the washer 77 is just in contact with spring seat 86 on the caging element 84 with the snap ring 87 in contact with rib 85 of the sleeve 75. This movement of the pilot piston 61 acts to turn the lever 92 in a counterclockwise direction about the fulcrum connection with the power piston rod 22 to cause a corresponding rocking movement of the control lever 52 of the control device 32 for thereby actuating the valve device 36 to supply fluid under pressure to chamber 18 at the left hand face of the power piston 17 and for at the same time effecting operation of the valve device 35 to release fluid under pressure from chamber 20 at the opposite side of the power piston. A differential of fluid pressures will thereby be created on the power piston to move same in the direction of the left hand. After the pilot piston 61 comes to rest in the position in which the force of spring 88 is just removed from the washer 77, movement of the power piston 17 in the directon of the left hand will rock the lever 92 about the fulcrum connection with the pilot piston rod 68 and thereby operate rod 93 to turn lever 52 back to its neutral position for equalizing the fluid pressures on the power piston so as to stop said piston in a position corresponding to the position of the pilot piston 61 and the "Full" position of lever 101.

As the power piston 17 is thus moved from its extreme right hand position toward the left hand it operates the gear sector 11 to turn the sprocket wheels 7 and 4 and thereby the maneuvering gear shaft 1 from its "Start" position in a counter-clockwise direction and this movement will cease when said shaft obtains its "Full" position since opposing fluid pressures on the power piston 17 will be equalized at this time.

Now let it be assumed that the lever 101 is returned from "Full" position to "Slow" position to thereby reduce the pressure of fluid in chamber 63 at the left hand face of the pilot piston 61 to the low degree of seventeen pounds above mentioned. The force of springs 78 and 88 on washer 77 in the pilot device will then move the piston 61 further toward the left hand to a position in which the caging element 80 just comes into contact with the pins 82 in which position it will stop as required by the position of lever 101. This movement of the pilot piston 61 will again operate the lever 92 and thereby the control device 32 to again supply fluid under pressure to chamber 20 at the right hand face of the power piston 17 and reduce the pressure of fluid on the opposite face for causing movement of the piston further in the direction of the left hand and this movement will continue until the control lever 52 is again returned to neutral position for equalizing the fluid pressures on the power piston, which will occur in a position of said piston corresponding to the position in which the pilot piston 61 was stopped. This further movement of the power piston 17 toward the left hand will effect a corresponding operation of the gear sector 11 and sprocket wheels 7 and 4 to turn the maneuvering gear shaft 1 to its "Slow" position in which it will be stopped due to the power piston 17 being stopped and it should be noted that this position corresponds to that called for by the position of lever 101.

It will be readily seen that if the control lever 101 is moved to any position intermediate "Full" and "Slow" the proportional pressure provided in chamber 63 on the pilot piston 61 will provide a corresponding positioning of said piston against the combined opposing forces of springs 78 and 88, and that the valve device 32 and power piston 17 will respond to adjust the maneuvering gear shaft 1 to a corresponding position between "Full" and "Slow" positions. Thus by operation of lever 101 in the zone between "Full" and "Slow" positions to vary the pressure of fluid in chamber 63 on the pilot piston 61 between limits such as the fifty-two and seventeen pounds above mentioned, the pilot piston 61 will be positioned to provide for corresponding positioning of the power piston 17 and of the maneuvering gear shaft 1 to vary the speed or power output of the engine being controlled.

If now the operator desires to stop the engine, he moves the lever 101 to the position indicated by the legend "Stop" and the cam 103 is so designed that in this position a further reduction in fluid pressure, to a chosen low degree such as ten pounds, will be effected in pipe 99 and pilot piston chamber 63 by operation of the self-lapping control valve device 106, as a result of which the spring 78, now alone effective on washer 77, will move said washer to a position intermediate the spring seat 83 on the caging element 80 and the shoulder 73 to thereby correspondingly position the pilot piston 61 for effecting operation of the power piston 17 in the same manner as above described to actuate the gear sector 11 and sprocket wheels 7 and 4 to return the maneuvering gear shaft 1 to its "Stop" position for stopping the respective engine. This position is not critical like the "Slow" and "Full" positions above described so that positive position defining means is not required for same.

After the engine is stopped the lever 101 may be returned to its neutral position in which the self-lapping valve device 106 opens chamber 117 to the atmosphere and the cam 102 provides for operation of the directional control device 104 to open pipe 99 and pilot piston chamber 63 to atmosphere. The opposite faces of the pilot piston 61 will then both be subject to atmospheric pressure so that the pressure of spring 78 on the washer 77 will move same into contact with shoulder 73 on the cover 74 and thereby return the pilot piston 61 to its neutral position. This movement of the pilot piston 61 will operate the lever 92 and thereby the control valve device 32 in the same manner as before described to cause movement of the power piston 17 back to its neutral position for effecting operation of the gear sector 11 and thereby the sprocket wheels 7 and 4 to return the maneuvering gear shaft 1 to its neutral position.

If the operator now desires to move the craft in an astern direction, he rocks the lever 101 from the neutral position shown in a clockwise direction, as indicated by the arrow bearing the legend "Astern," to the "Start" position at the right hand side of the selector device 6. This operation of lever 101 actuates the selector valve device 105 to connect the control pipe 98 to chamber 117 and also operates the self-lapping valve device 106 in the same manner as before described for supplying fluid under pressure to the pipe 98 and thence to chamber 62 at the right hand side of the pilot piston 61. At this time chamber 63 at the left hand side of the pilot piston is open to the atmosphere by way of pipe 99 and the selector valve device 104.

The pressure of fluid thus supplied to chamber 62 at the right hand side of the pilot piston moves said piston in the direction of the left hand to a position in which the left hand end of sleeve 75 engages the washer 77, the spring 78 opposing such movement throughout the full stroke of the piston 61 and the springs 88 and 89 becoming successively effective to oppose such movement upon engagement of spring seat 83 on the caging element 80 with the washer 77 and subsequent engagement of spring seat 86 on the caging element 84 with said washer.

This movement of the pilot piston operates the lever 92 and thereby the control device 32 to supply fluid under pressure to chamber 20 and to release fluid under pressure from chamber 18 at opposite sides of the power piston 17 for thereby moving said piston to its extreme left hand position in which fluid pressures in said chambers will be again equalized by operation of the control valve device 32, this operation of the control device 32 and power piston 17 being substantially like that before described, as will be seen. This movement of the power piston 17 in turn operates the gear sector 11 and sprocket wheels 7 and 4 to turn the maneuvering gear shaft 1 in a clockwise direction from its "Neutral" position to the position indicated by the legend "Start" at the left hand side of the vertical center line of gear 4. The engine will therefore be started in the direction to cause astern movement of the craft.

After the engine is thus put in motion, the lever 101 is returned to either "Full" or "Slow" position, or to an intermediate position at the right hand side of said lever for thereby reducing the pressure of fluid acting on the right hand side of the pilot piston 61, as a result of which said piston will be moved toward the right to a position depending upon the reduced pressure of fluid in chamber 62. For instance if the lever is in "Full" position the pilot piston will assume a position where the snap ring 87 in the caging element 84 will be in contact with rib 85 in sleeve 75 while spring seat 86 at the opposite end of said caging element will be just in contact with washer 77. If the lever is moved to the "Slow" position, the piston 61 will assume a position in which the caging element 80 will be in contact with pins 82 in the sleeve 75 and also in contact with the washer 77. For all intermediate positions of lever 101 the caging element 80 will be disengaged from the pins 82 but in contact with the washer 78. Thus the position of the pilot piston 61, for all positions of the lever 101 between "Full" and "Slow" positions at the right hand side of the neutral position, is determined by the combined action of springs 88 and 78 and the opposing pressure of fluid supplied by the selector valve device 6, the same as above described for movement of the craft forwardly.

It will be seen that when the lever 101 is moved in the direction of the left hand to cause movement of the craft "Ahead" the sleeve 75 in the pilot device remains stationary and the washer 77 moves with the pilot piston 61, while upon movement of the lever 101 in the direction of the right hand for causing "Astern" movement of the craft the washer 77 remains stationary while the sleeve 75 is moved with the piston 61. In both cases however the spring 78 opposes all movement of the pilot piston from neutral position while the springs 88 and 89 are successively rendered effective upon an increase in pressure on the pilot piston or ineffective upon a reduction in pressure on the pilot piston, in the same order and to accomplish the same results for both directions of movement of lever 101 and thereby of the pilot piston 61.

When the pilot piston 61 moves from its neutral position toward the left hand to a position corresponding to the position of the control lever 101 at the right hand side of its neutral position between "Slow" and "Full" positions, the lever 92 and control valve device 32 will be operated to cause a corresponding positioning of the power piston 17 and thereby of the gear sector 11, sprocket wheels 7 and 4 and maneuvering gear shaft 1, in the same manner as before described as will be readily seen.

If during "Astern" movement of the craft the operator desires to stop the engine, he moves the lever 101 to the "Stop" position at the right hand side of the neutral position to thereby reduce the pressure in the control pipe 98 for positioning the pilot piston 61 to cause a corresponding positioning of power piston 17 and thereby of the maneuvering gear shaft 1 required for stopping of the engine. After the engine is stopped, the operator may then move the lever 101 back to its neutral position for completely releasing fluid under pressure from the pipe 98 by way of the selector valve device 105 and thereby from chamber 62 at the right hand face of the pilot piston 61. The pilot piston 61 will then be returned to its neutral position by spring 78 following which the power piston 17 will be operated to its neutral position for returning the maneuvering gear shaft 1 to its "Neutral" position.

If the craft is being propelled in a forwardly direction and the operator desires to reverse the direction of movement, he may do so by moving the lever 101 from whatever position it may occupy at the left hand side of neutral position to the "Start" position at the right hand side of neutral position for thereby opening the control pipe 99 to atmosphere and for supplying fluid under pressure to pipe 98 to the degree required for moving the pilot piston 61 to its extreme left hand position upon the release of fluid under pressure on the opposite side of the pilot piston by way of pipe 99. After the pilot piston 61 thus operates and a corresponding operation of the power piston 17 and movement of the maneuvering control shaft 1 to its "Start" position at the left hand side of the vertical centerline of said shaft occurs, the operator may move the lever 101, back to "Full, "Slow" or any desired intermediate speed position at the right hand side of the neutral position for causing movement of the craft in an astern direction at a desired rate of speed.

In case the craft is moving in an astern direction and the operator desires to reverse the direction of movement, he will merely move lever 101 from the position it may occupy at the right side of its neutral position to the "Start" position at the opposite side of the neutral position and then back into a selected position in the zone between "Full" and "Slow" positions following which the control motor 15 will operate to correspondingly position the maneuvering gear shaft 1 in a manner which will be evident from the above description.

In order that the pilot of the craft may be aware of the integrity or proper operation of the control system I associate with the control valve device 32 two switches 157 and 158, one located at one side of the lever 52 for operation thereby upon movement in one direction and the other located at the opposite side of the lever for operation by the lever upon movement in the opposite direction. Each of these switches may be of identical structure comprising, diagrammatically, a contact element 160 arranged to be operated by lever 52 upon movement out of its neutral position to electrically connect two fixed contacts 161 and 162. A spring 163 acting on each of the contact elements 160 is provided for actuating the element out of bridging relation with the contacts 161 and 162 when the lever 152 is returned to its neutral position. The contact 161 of both switches 157 and 158 is connected to any suitable source of electrical current such as a battery 164, while the contact 162 of both switches is connected to a wire 165 leading to an indicating device 166, preferably of the audible type, such as a buzzer. By this arrangement it will be seen that rocking of the lever 52 in either direction in response to movement of the lever 101 out of its neutral position will cause operation of the buzzer 166 to indicate to the pilot that the pilot device 33 and control device 32 associated therewith are operating as intended. When the power piston 17 then moves to the position determined by the position of the pilot piston 61 and the lever 52 is returned to neutral position, the circuit to the buzzer 166 will be opened and said buzzer will stop sounding to indicate to the pilot that the power piston 17 has operated as intended and therefore the maneuvering gear shaft 1 has been moved to the desired position. It will be seen that if the apparatus operates as intended in response to movement of the control lever 101 in either direction, the buzzer 166 will be caused to operate and then stop operating. In case the buzzer 166 fails to operate at all, the pilot's attention will be directed to the fact that the pilot device 33 or control device 32 is not operating as required or that some other part of the system is out of order, such for example as the circuit to the buzzer or possibly failure of the fluid pressure supply to the selector device 6 or to pipe 98 or 99, whereupon suitable measures may be promptly taken to correct the fault. Further, if the buzzer 166 starts operating in response to operation of the control device 32, but ceases to stop the operator is made aware of the fact that some part of the system beyond the control device 32 is not operating as intended, as for instance failure of the power piston 17 to move.

In addition to the above I provide a pneumatically controlled switch device 167 controlled by the reduced pressure of fluid in pipe 41 to cause operation of the buzzer 166 in case the pressure in the said pipe becomes reduced to a degree below a chosen value.

This device comprises a piston 168 having at one side a chamber 169 in constant communication through pipe 170 with pipe 41 whereby the piston 168 is constantly subject on one face to the pressure of fluid supplied by the reducing valve device 40 to pipe 41. The opposite side of piston 168 is subject to the pressure of a spring 171, which is of such value as to provide for movement of the piston 168 to the position shown if the pressure in pipe 41 is above a chosen safe degree, but to move piston 168 in the direction of chamber 169 in case the pressure in pipe 41 is at a lower degree.

The piston 168 is connected by a stem 172 to a movable switch contact 173 which is arranged to electrically connect two fixed contacts 174 and 175 upon movement of the piston 168 to its lower position and to open the circuit between such contacts when in its upper position shown. The contact 175 is connected to the battery 164 while the contact 174 is connected to wire 165 leading to the buzzer 166. By this arrangement, the contact 173 will be held out of engagement with contacts 174 and 175 whenever the pressure of fluid supplied by the reducing valve device 40 to pipe 41 is at or above a safe degree, but in case this pressure becomes reduced to below the safe degree, movement of the piston 168 to its lower position will move contact 173 into engagement with the contacts 174 and 175 for connecting the battery 164 to the buzzer 166 to cause operation of said buzzer and thereby call the pilot's attention to the low pressure condition in the system. A cutout switch 176 is provided in wire 165 to render the buzzer 166 inoperative when the system is void of fluid under pressure.

Summary

From the above description, it will now be seen that I have provided a system whereby a member may with exactness be caused to move to any selected one of a plurality of different positions selected by an operator at a remote control station. At the control station, the operator is provided with a selector device having positions corresponding to those of the member to be controlled, and associated with said member is a pneumatic power mechanism arranged to operate in accordance with selected operations of the pilot's selector device to cause positioning of said member in accordance with a chosen operation of the selector device. I associate with the power means a plurality of springs arranged to become successively effective or to be rendered successively ineffective to provide for accurate positioning of the pilot means in response to operation of the selector device in order that the power means which controls the member being operated may with accuracy move said member to the selected position. In order to insure that the operator will be always aware of the operative condition of the system and thus minimize the possibility of failure of the system in use, I provide means for indicating whether or not the pressure of fluid in the system is adequate and for also indicating whether the mechanism operates as intended in response to a selected operation of the operator.

Having now described my invention, what I claim as new and desire to secure by Letters Patent, is:

In combination, a cylinder, a power piston in said cylinder, a valve device comprising a lever means operable upon movement from one position to a second position to create a differential between fluid pressures acting on opposite sides of said piston for effecting movement thereof and operable upon return to said one position to destroy said differential to stop movement of said piston, another cylinder, a pilot piston in the last named cylinder movable by fluid pressure, means connecting the two pistons and lever means, said pilot piston being operable upon movement by fluid under pressure to actuate said means to move said lever means to said second position and said power piston being operable upon cessation of movement of said pilot piston to actuate said means to move said lever means to said first position, a manual control device at a control station operable by an operator to effect a supply of fluid under pressure to actuate said pilot piston, a signal device at said control station, and means for effecting operation of said signal device controlled by said lever means and operable upon movement of said lever means out of said one position to effect operation of said signal device and to stop operation of said signal device upon return to said one position.

ROY R. STEVENS.